US012664363B2

(12) United States Patent
Pawar et al.

(10) Patent No.: US 12,664,363 B2
(45) Date of Patent: Jun. 23, 2026

(54) METHOD AND SYSTEM FOR EVALUATING NON-FICTION NARRATIVE TEXT DOCUMENTS

(71) Applicant: Tata Consultancy Services Limited, Mumbai (IN)

(72) Inventors: Sachin Sharad Pawar, Pune (IN); Girish Keshav Palshikar, Pune (IN); Ankita Jain, Indore (IN); Mahesh Prasad Singh, Noida (IN); Mahesh Rangarajan, Bangalore (IN); Aman Agarwal, Noida (IN); Kumar Karan Singh, Noida (IN); Hetal Jani, Gandhinagar (IN); Vishal Kumar, Noida (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 176 days.

(21) Appl. No.: 18/583,186

(22) Filed: Feb. 21, 2024

(65) Prior Publication Data
US 2024/0320427 A1    Sep. 26, 2024

(30) Foreign Application Priority Data
Mar. 21, 2023    (IN) ............................. 202321019476

(51) Int. Cl.
*G06F 40/253*        (2020.01)
*G06F 40/279*        (2020.01)

(52) U.S. Cl.
CPC .......... *G06F 40/253* (2020.01); *G06F 40/279* (2020.01)

(58) Field of Classification Search
CPC .... G06F 40/253; G06F 40/279; G06F 40/166; G06F 40/216
See application file for complete search history.

(56) References Cited

U.S. PATENT DOCUMENTS

| | | | |
|---|---|---|---|
| 10,380,002 B1* | 8/2019 | Ophir | G06F 16/24568 |
| 10,997,369 B1* | 5/2021 | Frazier | G06N 3/049 |
| 2014/0172417 A1* | 6/2014 | Monk, II | G06F 40/30 704/9 |

(Continued)

FOREIGN PATENT DOCUMENTS

| | | |
|---|---|---|
| CN | 110795538 A | 2/2020 |
| WO | WO 2021/139265 A1 | 7/2021 |

OTHER PUBLICATIONS

Roche et al., "Using Natural Language Processing to Increase Modularity and Interpretability of Automated Essay Evaluation and Student Feedback," SMU Data Science Review, 6(2) (2022).

*Primary Examiner* — Darioush Agahi
(74) *Attorney, Agent, or Firm* — FINNEGAN, HENDERSON, FARABOW, GARRETT & DUNNER LLP

(57)        ABSTRACT
Existing approaches for processing and evaluation of documents containing non-fiction narrative texts have the disadvantage that they are comparatively less studied in linguistics, and hence do not provide sufficient data required for evaluations. Method and system are for evaluating non-fiction narrative text documents are provided. The system processes a plurality of non-fiction narrative text documents and computes a plurality of corpus statistics. The plurality of corpus statistics is then used for evaluation of any non-fiction narrative text document that may or may not be collected as real-time input.

6 Claims, 4 Drawing Sheets

(56)                       References Cited

U.S. PATENT DOCUMENTS

2022/0050969 A1 *   2/2022   Avhad .................... G06F 40/253
2023/0153546 A1 *   5/2023   Peleg ..................... G06F 40/56
                                                    704/9

* cited by examiner

100

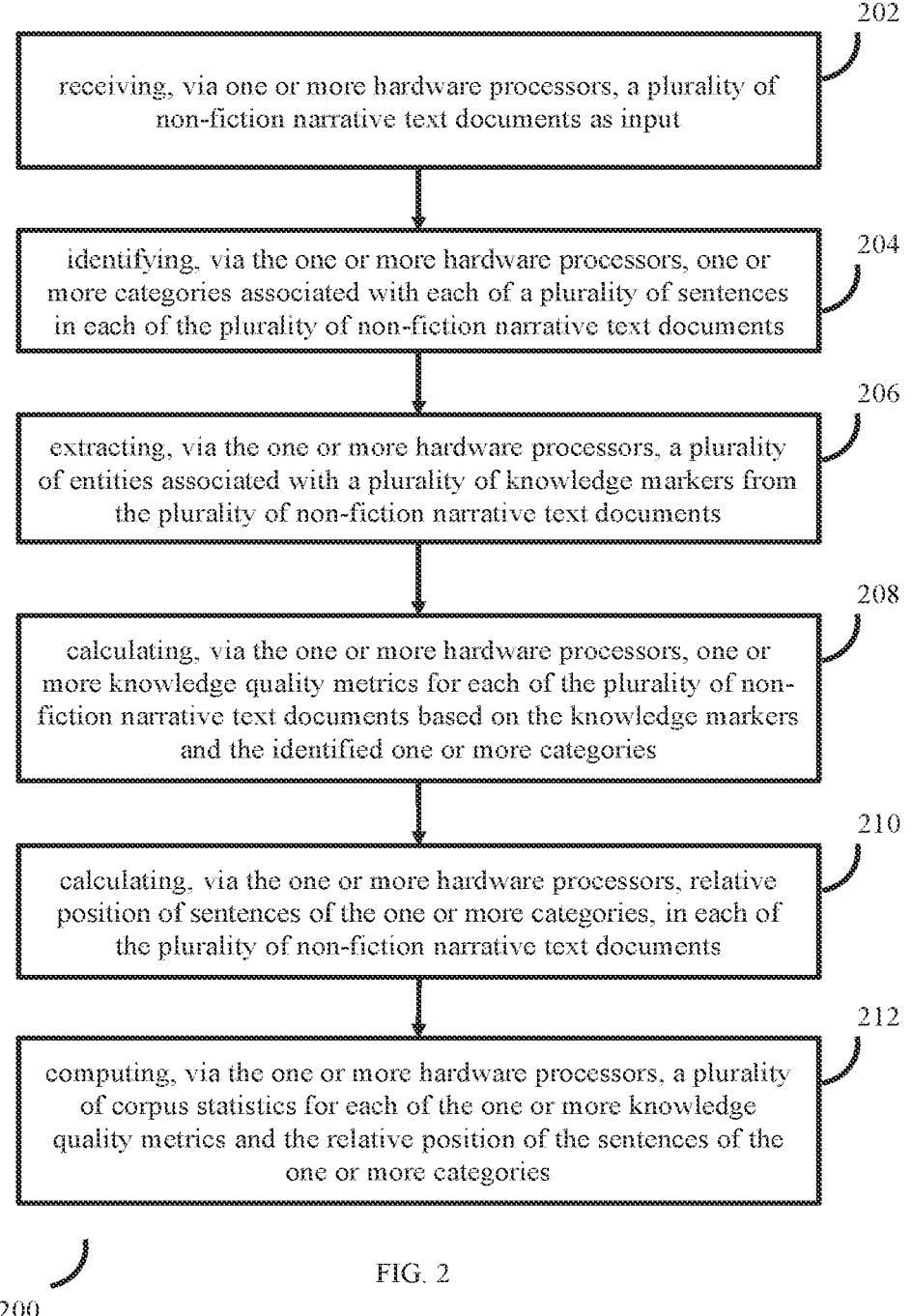

receiving, via one or more hardware processors, a plurality of non-fiction narrative text documents as input ⟶ 202 identifying, via the one or more hardware processors, one or more categories associated with each of a plurality of sentences in each of the plurality of non-fiction narrative text documents ⟶ 204 extracting, via the one or more hardware processors, a plurality of entities associated with a plurality of knowledge markers from the plurality of non-fiction narrative text documents ⟶ 206 calculating, via the one or more hardware processors, one or more knowledge quality metrics for each of the plurality of non-fiction narrative text documents based on the knowledge markers and the identified one or more categories ⟶ 208 calculating, via the one or more hardware processors, relative position of sentences of the one or more categories, in each of the plurality of non-fiction narrative text documents ⟶ 210 computing, via the one or more hardware processors, a plurality of corpus statistics for each of the one or more knowledge quality metrics and the relative position of the sentences of the one or more categories ⟶ 212

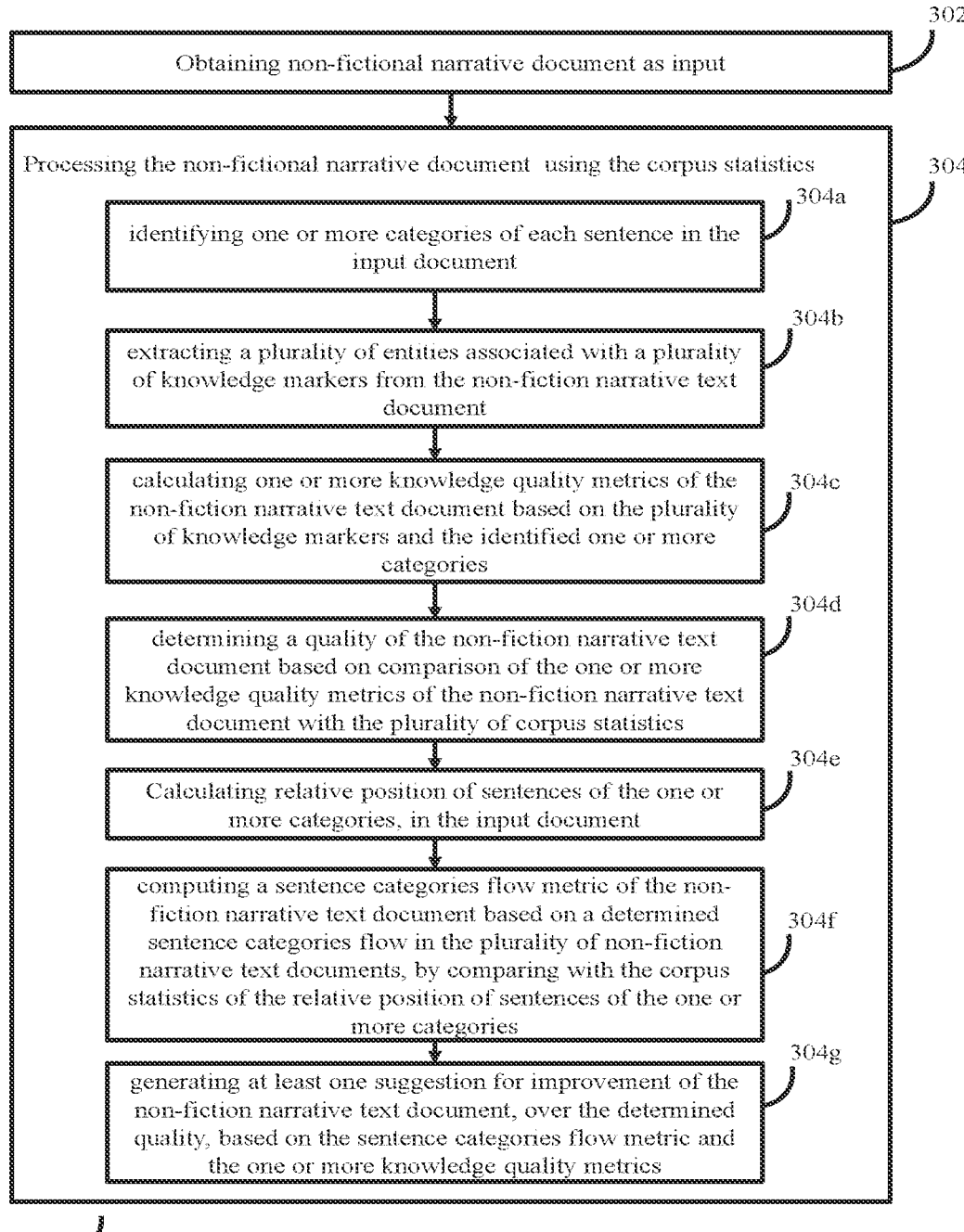

302

Obtaining non-fictional narrative document as input

Processing the non-fictional narrative document using the corpus statistics

304

304a identifying one or more categories of each sentence in the input document

304b extracting a plurality of entities associated with a plurality of knowledge markers from the non-fiction narrative text document 304c calculating one or more knowledge quality metrics of the non-fiction narrative text document based on the plurality of knowledge markers and the identified one or more categories 304d determining a quality of the non-fiction narrative text document based on comparison of the one or more knowledge quality metrics of the non-fiction narrative text document with the plurality of corpus statistics 304e Calculating relative position of sentences of the one or more categories, in the input document 304f computing a sentence categories flow metric of the non-fiction narrative text document based on a determined sentence categories flow in the plurality of non-fiction narrative text documents, by comparing with the corpus statistics of the relative position of sentences of the one or more categories 304g generating at least one suggestion for improvement of the non-fiction narrative text document, over the determined quality, based on the sentence categories flow metric and the one or more knowledge quality metrics

METHOD AND SYSTEM FOR EVALUATING NON-FICTION NARRATIVE TEXT DOCUMENTS

PRIORITY CLAIM

This U.S. patent application claims priority under 35 U.S.C. § 119 to: Indian patent application Ser. No. 202321019476, filed on Mar. 21, 2023. The entire contents of the aforementioned application are incorporated herein by reference.

TECHNICAL FIELD

The disclosure herein generally relates to document processing, and, more particularly, to method and system for evaluating non-fiction narrative text documents.

BACKGROUND

Documents containing non-fiction narrative text occur in many practical applications, for example, essays, news, emails, safety or security incident reports, insurance claims, medico-legal reports, troubleshooting guides, user manuals and so on. It is important to ensure that each such document is of high quality, however, for this purpose specific metrics are required. While metrics for readability (or comprehensibility) are usable, specialized metrics that attempt to measure quality of non-fiction narrative text in terms of the specific characteristics are required. Fictional narratives are characterized in terms of structural elements such as conflicts, plot points, dialogues, characters, character arcs, focus, and so on. There is extensive literature about such linguistic analysis. However, nonfiction narrative texts are comparatively less studied in linguistics.

SUMMARY

Embodiments of the present disclosure present technological improvements as solutions to one or more of the above-mentioned technical problems recognized by the inventors in conventional systems. For example, in one embodiment, a processor implemented method is provided. In this method, initially a plurality of non-fiction narrative text documents is received, via one or more hardware processors, as input. Further, one or more categories associated with each of a plurality of sentences in each of the plurality of non-fiction narrative text documents are identified via the one or more hardware processors. Further, a plurality of entities associated with a plurality of knowledge markers from the plurality of non-fiction narrative text documents are extracted, via the one or more hardware processors. Further, one or more knowledge quality metrics are calculated, via the one or more hardware processors, for each of the plurality of non-fiction narrative text documents based on the knowledge markers and the identified one or more categories. Further, relative position of sentences of the one or more categories, in each of the plurality of non-fiction narrative text documents is calculated, via the one or more hardware processors. Further, a plurality of corpus statistics is computed, via the one or more hardware processors, for each of the one or more knowledge quality metrics and the relative position of the sentences of the one or more categories.

In another embodiment, the plurality of corpus statistics is used to evaluate a non-fiction narrative text document received as an input document. Evaluating the non-fiction narrative text document includes obtaining the non-fiction narrative text document as input, and processing the non-fiction narrative text document using the plurality of corpus statistics. Processing the non-fiction narrative text document includes the following steps. Initially, one or more categories of each sentence in the input document are identified. Further, a plurality of entities associated with a plurality of knowledge markers are extracting from the non-fiction narrative text document. Further, one or more knowledge quality metrics of the non-fiction narrative text document are calculated based on the plurality of knowledge markers and the identified one or more categories. Further, a quality of the non-fiction narrative text document is determined based on comparison of the one or more knowledge quality metrics of the non-fiction narrative text document with the plurality of corpus statistics. Further, relative position of sentences of the one or more categories in the input document is calculated. Further, a sentence categories flow metric of the non-fiction narrative text document is computed based on a determined sentence categories flow in the plurality of non-fiction narrative text documents, by comparing with the corpus statistics of the relative position of sentences of the one or more categories. Further, at least one suggestion for improvement of the non-fiction narrative text document is generated, over the determined quality, based on the sentence categories flow metric and the one or more knowledge quality metrics.

In yet another aspect, a system is provided. The system includes one or more hardware processors, a communication interface, and a memory storing a plurality of instructions. The plurality of instructions cause the one or more hardware processors to receive a plurality of non-fiction narrative text documents as input. Further, one or more categories associated with each of a plurality of sentences in each of the plurality of non-fiction narrative text documents are identified via the one or more hardware processors. Further, a plurality of entities associated with a plurality of knowledge markers from the plurality of non-fiction narrative text documents are extracted, via the one or more hardware processors. Further, one or more knowledge quality metrics are calculated, via the one or more hardware processors, for each of the plurality of non-fiction narrative text documents based on the knowledge markers and the identified one or more categories. Further, relative position of sentences of the one or more categories, in each of the plurality of non-fiction narrative text documents is calculated, via the one or more hardware processors. Further, a plurality of corpus statistics is computed, via the one or more hardware processors, for each of the one or more knowledge quality metrics and the relative position of the sentences of the one or more categories.

In yet another embodiment, the system uses the plurality of corpus statistics to evaluate a non-fiction narrative text document received as an input document. Evaluating the non-fiction narrative text document includes obtaining the non-fiction narrative text document as input, and processing the non-fiction narrative text document using the plurality of corpus statistics. Processing the non-fiction narrative text document includes the following steps. Initially, one or more categories of each sentence in the input document are identified. Further, a plurality of entities associated with a plurality of knowledge markers are extracting from the non-fiction narrative text document. Further, one or more knowledge quality metrics of the non-fiction narrative text document are calculated based on the plurality of knowledge markers and the identified one or more categories. Further, a quality of the non-fiction narrative text document is determined based on comparison of the one or more knowledge quality metrics of the non-fiction narrative text document with the plurality of corpus statistics. Further, relative position of sentences of the one or more categories in the input document is calculated. Further, a sentence categories flow metric of the non-fiction narrative text document is computed based on a determined sentence categories flow in the plurality of non-fiction narrative text documents, by comparing with the corpus statistics of the relative position of sentences of the one or more categories. Further, at least one suggestion for improvement of the non-fiction narrative text document is generated, over the determined quality, based on the sentence categories flow metric and the one or more knowledge quality metrics.

In yet another aspect, a non-transitory computer readable medium is provided. The non-transitory computer readable medium includes a plurality of instructions, which when executed, causes one or more hardware processors to initially receive a plurality of non-fiction narrative text documents as input. Further, one or more categories associated with each of a plurality of sentences in each of the plurality of non-fiction narrative text documents are identified via the one or more hardware processors. Further, a plurality of entities associated with a plurality of knowledge markers from the plurality of non-fiction narrative text documents are extracted, via the one or more hardware processors. Further, one or more knowledge quality metrics are calculated, via the one or more hardware processors, for each of the plurality of non-fiction narrative text documents based on the knowledge markers and the identified one or more categories. Further, relative position of sentences of the one or more categories, in each of the plurality of non-fiction narrative text documents is calculated, via the one or more hardware processors. Further, a plurality of corpus statistics is computed, via the one or more hardware processors, for each of the one or more knowledge quality metrics and the relative position of the sentences of the one or more categories.

In yet another aspect, a non-transitory computer readable medium configures the one or more hardware processors to use the plurality of corpus statistics to evaluate a non-fiction narrative text document received as an input document. Evaluating the non-fiction narrative text document includes obtaining the non-fiction narrative text document as input, and processing the non-fiction narrative text document using the plurality of corpus statistics. Processing the non-fiction narrative text document includes the following steps. Initially, one or more categories of each sentence in the input document are identified. Further, a plurality of entities associated with a plurality of knowledge markers are extracting from the non-fiction narrative text document. Further, one or more knowledge quality metrics of the non-fiction narrative text document are calculated based on the plurality of knowledge markers and the identified one or more categories. Further, a quality of the non-fiction narrative text document is determined based on comparison of the one or more knowledge quality metrics of the non-fiction narrative text document with the plurality of corpus statistics. Further, relative position of sentences of the one or more categories in the input document is calculated. Further, a sentence categories flow metric of the non-fiction narrative text document is computed based on a determined sentence categories flow in the plurality of non-fiction narrative text documents, by comparing with the corpus statistics of the relative position of sentences of the one or more categories. Further, at least one suggestion for improvement of the non-fiction narrative text document is generated, over the determined quality, based on the sentence categories flow metric and the one or more knowledge quality metrics.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 is a flow diagram depicting steps involved in the process of generating corpus statistics for evaluation of non-fiction narrative text documents, by the system of FIG. 1, according to some embodiments of the present disclosure.

FIG. 3 is a flow diagram depicting steps involved in the process of evaluating non-fiction narrative text documents using the corpus statistics, by the system of FIG. 1, for evaluation of, according to some embodiments of the present disclosure.

DETAILED DESCRIPTION

Figure 1:
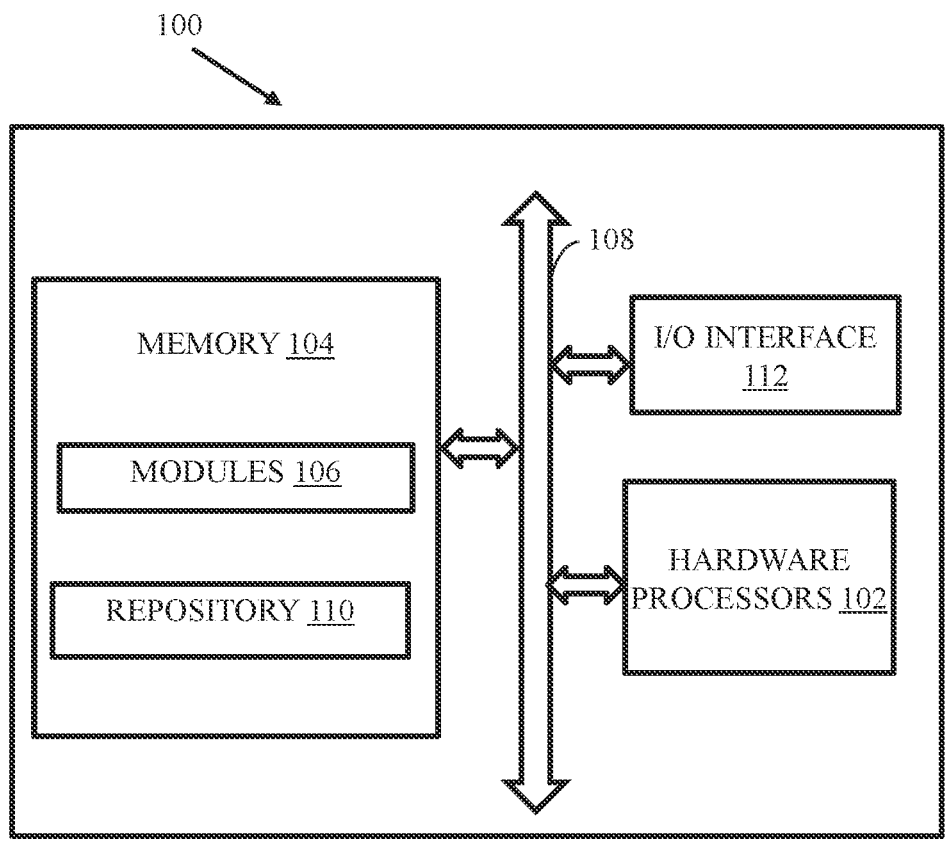
FIG. 1 illustrates an exemplary system for evaluation of non-fiction narrative text documents, according to some embodiments of the present disclosure.
Figure 4:
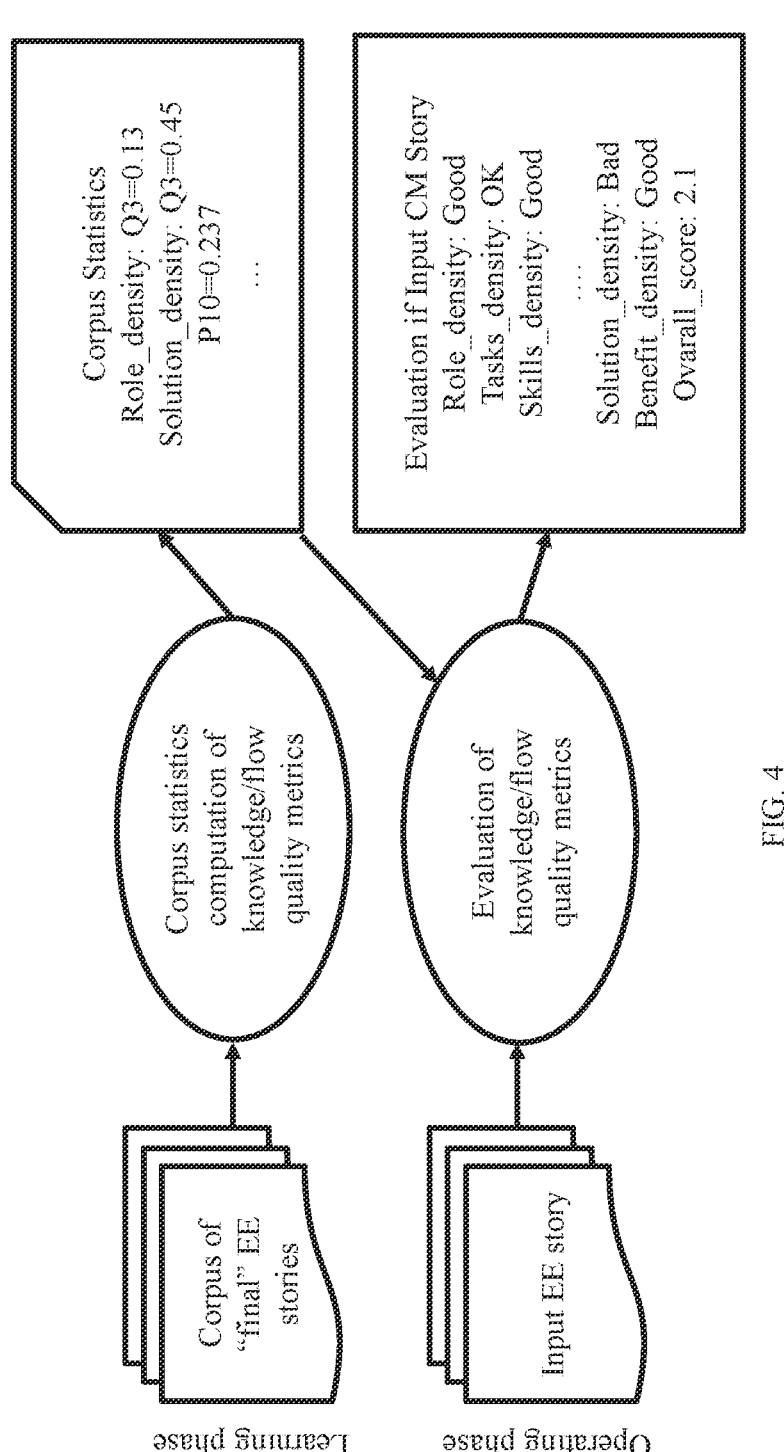
FIG. 4 depicts an example architecture of the system of FIG. 1, for evaluation of non-fiction narrative text documents, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Documents containing non-fiction narrative text occur in many practical applications, for example, essays, news, emails, safety or security incident reports, insurance claims, medico-legal reports, troubleshooting guides, user manuals and so on. It is important to ensure that each such document is of high quality, however, for this purpose specific metrics are required. While metrics for readability (or comprehensibility) are usable, specialized metrics that attempt to measure quality of non-fiction narrative text in terms of the specific characteristics are required. Fictional narratives are characterized in terms of structural elements such as conflicts, plot points, dialogues, characters, character arcs, focus, and so on. There is extensive literature about such linguistic analysis. However, nonfiction narrative texts are comparatively less studied in linguistics.

In order to overcome these challenges, a method and system are for evaluating non-fiction narrative text documents are provided. The system processes a plurality of non-fiction narrative text documents and computes a plurality of corpus statistics. The plurality of corpus statistics is then used for evaluation of any non-fiction narrative text document that may or may not be collected as real-time input.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

FIG. 1 illustrates an exemplary system for evaluation of non-fiction narrative text documents, according to some embodiments of the present disclosure.

The system 100 includes or is otherwise in communication with hardware processors 102, at least one memory such as a memory 104, and I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 106.

The plurality of modules 106 include programs or coded instructions that supplement applications or functions performed by the system 100 for executing different steps involved in the process of batch processing of jobs, being performed by the system 100. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the switching between hardware accelerators for the batch processing of jobs.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to the steps in flow diagrams in FIG. 2 and FIG. 3.

FIG. 2 is a flow diagram depicting steps involved in the process of generating corpus statistics for evaluation of non-fiction narrative text documents, by the system of FIG. 1, according to some embodiments of the present disclosure.

In an embodiment, the system 100 comprises one or more data storage devices or the memory 104 operatively coupled to the processor(s) 102 and is configured to store instructions for execution of steps of the method 200 by the processor(s) or one or more hardware processors 102. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

FIG. 2 is a flow diagram depicting steps involved in the process of generating corpus statistics for evaluation of non-fiction narrative text documents, by the system of FIG. 1, according to some embodiments of the present disclosure.

At step 202 of method 200 in FIG. 2, a plurality of non-fiction narrative text documents is received, via one or more hardware processors 102, as input. In an embodiment, the plurality of non-fiction narrative text documents is fetched from any external data source which is connected to the system 100 via one or more suitable interfaces. Further, at step 204 of the method 200, the system 100 identifies one or more categories associated with each of a plurality of sentences in each of the plurality of non-fiction narrative text documents, via the one or more hardware processors 102. The different categories maybe specific to the type of content in each of the plurality of non-fiction narrative text documents being processed.

For example, consider that the non-fiction narrative text document being processed contains one or more Expert Experience (EE) stories. An expert in this context is a technical or domain expert in a large IT services and consulting organization, who has over the time gained a significant knowledge or understanding of a business domain or a particular client's business. An EE story is a short narrative text that an expert writes to describe a particular instance where he/she has used the expert-level knowledge to solve a specific problem or to address a specific challenge. A typical process of writing these stories is that an expert first writes some initial version which is reviewed by reviewers for knowledge contents, readability, narration flow and other aspects like grammar. Over a few iterations of incorporating reviewers' suggestions, a story is accepted to be published internally and for marketing purposes. In this scenario, the document may contain sentences of the following categories.

Background: Sentences describing some background for the client for which a problem is being solved. E.g., The client is a European healthcare organization which offers a platform to manage user manuals and operator documents.

Problem: Sentences describing the actual problem or challenge that is being addressed in the EE story. E.g., The users were not able to search for the mortgage related documents for some of the indexed mortgage deals.

Expert_Knowledge: Sentences describing specific technical or domain knowledge of the expert in the context of the problem being solved. E.g., He has brought 25 years of a strong domain knowledge in supply chain area.

Solution: Sentences describing the proposed solution, analysis, or actual implementation or execution of the solution. E.g., Agile approach was adopted to develop the planned functionalities in multiple sprints.

Benefit: Sentences describing the benefits achieved from the implemented solution. E.g., Also, manufacturing solution enabled to bring the legacy system into SAP resulting into dropping additional manpower requirement.

Client_Appreciation: Sentences describing the positive feedback or appreciations received from the client. E.g., The client was highly impressed with the reusability of the new automated solution.

Likewise, based on contents of each of the documents, appropriate sentence categories maybe derived. The system 100 may be configured to model a problem of identifying appropriate sentence categories as a multi-label, multi-class sentence classification problem. The multi-label setting maybe used because in some cases, a sentence may have more than one valid category. For example, the following sentence belongs to Solution as well as Benefit—"He used his understanding of the client's applications and restructured the database accordingly to reduce recurring issues, which resulted in reduction in incidents by 70%". The system 100 may use any suitable sentence classification model, for example, one which is based on DistilBERT, or a lighter version of BERT. DistilBERT model was found to be 40% smaller than BERT while retaining its 97% language understanding capabilities. DistilBERT was found to be capable of producing semantically rich representations for any input text and the individual words in it. These representations were 768 dimensional dense vectors of real numbers (R768). The representations were used for building the classifier to predict appropriate sentence categories for a sentence, for example, in the EE story scenario considered above. The model architecture is explained in detail, below:

Let the input sentence be S which is first passed through the pre-trained DistilBERT model to obtain—(i) [CLS] token encoding which provides the representation of the entire input text S, and (ii) the representations for each word in S. [CLS] stands for classification.

$$x_{CLS}, X = DistilBERT(S) \tag{1}$$

Here, $x_{CLS} \in \mathbb{R}^{768}$ and $X \in \mathbb{R}^{L*768}$, where L is maximum number of words in any input sentence. Let $X_i \in \mathbb{R}^{768}$ be representation of $i^{th}$ word in S. An attention mechanism was used so that the contribution of each word in S is determined based on its importance for prediction of each of the sentence categories. 6 attention layers corresponding to the 6 sentence categories were used in an example implementation, wherein each attention layer is represented as:

$$a_i^c = w_a^{cT} \cdot X_i + b^c \tag{2}$$

where, $$W_a^c \in \mathbb{R}^{768}$$

and $b^c \in R$ are weight vector and bias of attention later for category c, respectively.

$$a_i^c \in R$$

is score for $i^{th}$ word as computed by attention layer for category c. The scores are normalized across all words in S to obtain final attention weights $$\alpha_i^c s,$$

which are used to obtain a weighted average of word representations.

$$a_i^c = \frac{\exp(a_i^c)}{\sum_{j=1}^{L} \exp(a_j^c)}; x_w^c = \sum_{i=1}^{L} \alpha_i^c . X_i \tag{3}$$

Finally, the overall representation $$\left(x_{final}^c \in \mathbb{R}^{1536}\right)$$

of the input sentence is obtained by concatenating representations obtained in Equations 1 and 3.

$$x_{final} = [x_{CLS}; x_w^c]$$

This final representation is then passed through a linear transformation layer to obtain a hidden representation.

$$x_c^h = ReLU\left(W_h.x_{final}^c + b_h\right)$$

Here, $W_h \in \mathbb{R}^{H*1536}$ and $b_h \in \mathbb{R}^H$ are weight matrix and bias vector of hidden layer, where H is number of units in the hidden layer. Finally, each sentence category has its different output layer to predict a probability distribution over two labels −c and Not −c.

$$y_{pred}^c = \text{Softmax}\,(W_o^c.x_h^c + b_o^c)$$

$$\text{loss}_c = \text{Cross Entropy Loss}(y_{gold}^c, y_{pred}^c); \text{loss} = \sum_c \text{loss}_c$$

Here, $$W_o^c \in \mathbb{R}^{2*H} \text{ and } b_o^c \in \mathbb{R}^2$$

are the weight matrix and the bias vector of the output layer corresponding to the sentence category c. Cross entropy loss is computed using the predicted and the gold-standard label distributions which is summed over all categories to get the overall loss. The model is then trained to minimize this loss over the labelled training data. In an experimental setup, a training set of 1618 sentences which were labelled manually using a few active learning iterations was used. The trained sentence classification model was evaluated on a held out evaluation dataset of 636 sentences. As can be seen in Table. 1, classification performance measurement of this model indicated that F1-score of about 80% was obtained.

TABLE 1

| Sentence classifier evaluation results | | | | | | | |
|---|---|---|---|---|---|---|---|
| Sentence category | Precision | Recall | F1 | Sentence category | precision | Recall | F1 |
| Background | 0.787 | 0.808 | 0.797 | Problem | 0.762 | 0.701 | 0.730 |
| Expert_knowledge | 0.817 | 0.870 | 0.843 | Solution | 0.803 | 0.704 | 0.750 |
| benefit | 0.782 | 0.806 | 0.794 | Client_app | 0.875 | 0.854 | 0.864 |
| Overall (micro avg) | 0.794 | 0.766 | 0.780 | Overall (macro avg) | 0.804 | 0.791 | 0.796 |

Further, at step 206 of the method 200, a plurality of entities associated with a plurality of knowledge markers from the plurality of non-fiction narrative text documents are extracted, via the one or more hardware processors 102. The knowledge markers are some key entity types in the document, that express knowledge required for solving a particular domain. Similar to the sentence categories, the knowledge markers also maybe specific to or is related to contents of each of the documents. For the EE story example considered above, the knowledge markers maybe:

Skills: Names of tools, technologies, or technical concepts such as SAP S4 HANA, shell scripting, data warehousing, SolarWinds.

Tasks: A task is a volitional and knowledge-based activity carried out by a person, a group of persons, or a system [10]. Some examples of Tasks are as follows: analysed the configuration of the security protocol, integrated SolarWinds with XYZ tool, development of several innovative solutions using S4 HANA processes.

Roles: A specific role performed by any human expert such as IT Manager, Manufacturing Solution Architect.

Concepts: Key noun phrases corresponding to certain domain-specific concepts. E.g., plastic manufacturing industry, legacy BI servers, unsupervised learning.

Likewise, appropriate knowledge markers maybe extracted, based on type of content in the document being processed. For the extraction of the knowledge markers, appropriate techniques maybe used. For example, for extraction of mentions of Skill, the system 100 may perform a lookup in a large gazette of known skill names, for identifying skill mentions. This gazette maybe created semiautomatically by combining several existing resources (like DBPedia) and a list created by appropriate semi-supervised iterative algorithms. Task mentions maybe extracted using one or more linguistic rules. For extracting Role mentions, the system 100 may adopt a gazette lookup-based strategy similar to Skill. For identification of domain-specific concepts, the system 100 may compute domain relevance scores for all the noun phrases and select only those which are above a certain threshold.

Further, at step 208 of the method 200, one or more knowledge quality metrics are calculated, via the one or more hardware processors 102, for each of the plurality of non-fiction narrative text documents based on the knowledge markers and the identified one or more categories.

For example, for an EE story s, for each knowledge marker and sentence category, the system 100 computes a metric which measures its density within the EE story as:

$$\text{Skills\_density}\,(s) = \frac{\text{Number of skill entity mentions in } s}{\text{number of sentenses in } s}$$

-continued $$\text{Solution\_density}\,(s) = \frac{\text{Number of Solution sentences in } s}{\text{number of sentenses in } s}$$

Here, the division by the number of sentences in s offsets the effect of the length of the EE story. Similarly, such metrics are computed for all knowledge markers as well as sentence categories—Skills_density, Tasks_density, Roles_density, Background_density, Concepts_density (based on knowledge markers), Problem_density, Expert_Knowledge_density, Solution_density, Benefit_density, and Client_Appreciation_density (based on sentence categories).

The step 208 is a learning phase (as depicted in the example architecture in FIG. 4, which also depicts processing of an input EE story as an operating phase), at which the system 100 calculates the plurality of knowledge quality metrics for the plurality of non-fiction narrative text documents received at the step 202. For example, the system 100 may calculate a set of aggregated knowledge quality metrics $Dist_{mean}$ and $Z_{sum}$, as explained below.

a. Distance from Mean Vector ($Dist_{mean}$):

This metric is based on vector ($\mu \in \mathbb{R}^{10}$) and covariance matrix ($\Sigma \in \mathbb{R}^{10+10}$) learned from the corpus of final accepted stories. For a new story s, let $\upsilon_s$ ($\in \mathbb{R}^{10}$) be the vector representing values of all the 10 knowledge quality metrics. Then the $Dist_{mean}$ metric is computed as the Mahalanobis distance of $\upsilon_s$ from $\mu$.

$$Dist_{mean}(s) = \sqrt{(\upsilon_s - \mu)^T \Sigma^{-1} (\upsilon_s - \mu)}$$

Lower value of $Dist_{mean}$ for a story indicates that the story is more similar to the ideal stories, and indicates better knowledge quality of s.

b. Sum of Scaled Metrics ($Z_{sum}$):

This metric is computed as the sum of scaled values of all the 10 knowledge quality metrics. For a new story s, let $\upsilon_{ms}$ ($\in R$) be value of knowledge quality metric m. This value is scaled up using mean ($\mu_m$) and standard deviation ($\sigma_m$) of m estimated from the corpus of final accepted stories. $Z_{sum}$ is computed as:

$$Z_{sum}(s) = \sum_m \frac{\upsilon_{ms} - \upsilon_m}{\sigma_m}$$

Higher the value of $Z_{sum}$, better is knowledge quality of s.

In an embodiment, the plurality of non-fiction narrative text documents received at step 202 are documents that have been reviewed and corrected. These documents are considered to be ideal, having incorporated human reviewers' suggestions.

Further, at step 210 of the method 200, the system 100 calculates, via the one or more hardware processors 102, relative position of sentences of the one or more categories, in each of the plurality of non-fiction narrative text documents. Step of calculating the relative position is explained with reference to the EE story example. For any i$^{th}$ sentence in an EE story of n sentences, the relative position is i/n. For a particular sentence category (say Solution), a sample of relative positions of all sentences belonging to that category is created from data in training corpus. The system 100 then computes mean ($\mu_{RP}$) and standard deviation ($\sigma_{RP}$) of the sample (e.g., for Solution, $\mu_{RP}$=0.6 and $\sigma_{RP}$=0:22). Now, given any new story s, the metric SCF Solution(s) is computed as the number of sentences of category "Solution" in s whose relative position is more than one standard deviation away from the mean, i.e., relative position outside the range [$\mu_{RP}$–$\sigma_{RP}$, $\mu_{RP}$+$\sigma_{RP}$]. Similar metrics are computed for other sentence categories in the same way (note that $\mu_{RP}$ and $\sigma_{RP}$ are specific to each sentence category). Lower the value of this SCF metric, better is the narration flow quality, because it simply counts the number of sentences of a particular sentence category which are at unusual relative positions within a story.

Further, at step 212 of the method 200, the system 100 computes a plurality of corpus statistics, via the one or more hardware processors 102, for each of the one or more knowledge quality metrics calculated in the learning phase i.e. at step 208, and the relative position of the sentences of the one or more categories.

Some of the corpus statistics maybe:

Mean and Standard Deviation ($\mu_m$ and $\sigma_m$)

Quartiles (q1$_m$: 25$^{th}$ percentile, q2$_m$: 50$^{th}$ percentile, i.e., median, and q3$_m$: 75$^{th}$ percentile)

Percentile ($P 10_m$: 10$^{th}$ percentile)

In this example implementation, the system 100 may have 10 knowledge quality metrics in total, based on 4 knowledge markers and 6 sentence categories. However, a person skilled in the art would appreciate the fact that this is for illustration purpose only and doesn't intent to limit scope of the embodiments herein in any manner. Number of the knowledge quality metrics, knowledge markers, and sentence categories may change as per implementation requirements.

The computed plurality of corpus statistics maybe then used for evaluating each non-fiction narrative text document received as an input document. Steps involved in this process are depicted in method 300 in FIG. 3, and are explained hereafter.

At step 302 of the method 300, the system 100 obtains the non-fiction narrative text document as input. Further, at step 304 of the method 300, the system 100 processes the non-fiction narrative text document using the plurality of corpus statistics. Processing the non-fiction narrative text document includes the following steps i.e. steps 304a through 304f. At step 304a, the system 100 identifies one or more categories of each sentence (i.e. sentence categories) in the input document. Further, at step 304b, a plurality of entities associated with a plurality of knowledge markers are extracted from the non-fiction narrative text document, based on the plurality of corpus statistics. Further, at step 304c, one or more knowledge quality metrics of the non-fiction narrative text document are calculated based on the plurality of knowledge markers and the identified one or more categories. Further, at step 304d, the system 100 determines a quality of the non-fiction narrative text document based on comparison of the one or more knowledge quality metrics of the non-fiction narrative text document with the plurality of corpus statistics.

Further, at step 304e, the system 100 calculates relative position of sentences of the one or more categories, in the input document. The relative position indicates position of sentences of each of the categories, with respect to position of sentences belonging to each other category.

Further, at step 304e, a sentence categories flow metric of the non-fiction narrative text document is computed based on a determined sentence categories flow in the plurality of non-fiction narrative text documents, by comparing with the corpus statistics. The sentence categories flow metric helps evaluate narration quality in the document being processed, and represents how well structured flow of narration in the document is.

Further, at step 304f, at least one suggestion for improvement of the non-fiction narrative text document is generated, over the determined quality, based on the sentence categories flow (SCF) metric. The system 100 may consider the one or more ideal documents as having a good quality of narration, which may be treated as a baseline/benchmark of quality. For example, in the EE story scenario explained above, any story begins with some background of the problem followed by the description of the problem itself. Then the contextual knowledge of the expert is discussed followed by the proposed or implemented solution. Finally, the story concludes by discussing the benefits that were achieved by the solution and whether any appreciations were received for it. Though it is not mandatory to strictly follow this flow of narration and some sentences can be out of place, the system 100 may be configured to consider this as a benchmark/ideal structure. Moreover, a good cohesive story will contain all the sentences describing a certain aspect (say Problem) in close proximity of each other and also at a proper relative position within the entire story. The sentence categories flow metric which captures these aspects of an ideal flow of sentence categories in the document, for example, in the EE story. The approach used for generating the sentence categories flow metric is explained below, with reference to the EE story example.

In this process, initially the system 100 determines the relative position of each sentence within the EE story. Based on this metric, suggestions for improvement are generated for those sentences in an EE story for which the relative position is outside the expected range. E.g., Please consider re-positioning the Solution sentence [x] which is appearing too early (or late) in your story. The system 100 is also configured to compute a single aggregate metric to combine the SCF metrics for individual sentence categories: $SCF_{all} = \Sigma_c SCF_c$.

The recommendations/suggestions generated by the system 100 maybe then provided to the user via suitable interface(s). For example, the recommendations maybe displayed to the user via suitable display interface, which may be a part of the system 100, or maybe externally connected to the system 100. In another embodiment, the recommendations/suggestions maybe sent by the system 100 to a mobile number or email address of the user, which has been configured with the system 100. It is to be noted by a person skilled in the art that the system 100 may use any other suitable approach to provide the recommendations/suggestions to the user, other than the aforementioned example approaches.

Experimental Results

In the example implementation, the following datasets were used.
a. Training Corpus ($D^{train}$)

This was a large corpus of 53675 EE stories consisting of 1.4 million sentences and 28.8 million words. The median length of these EE stories was 23 sentences. This corpus contained all the final EE stories which had been reviewed by human reviewers and revised multiple times by the story writers (experts) to incorporate the reviewers' suggestions. Hence, $D^{train}$ was considered to be a set of ideal stories and used it to learn corpus statistics (as in Table 2) of the knowledge quality metrics and flow quality metrics.

b. Evaluation dataset $$\left(D_i^{eval}, D_f^{eval}\right)$$

This dataset consisted of 67 EE stories where for each story two versions were available, i.e. a) an initial version $$\left(\epsilon \ D_i^{eval}\right)$$

which was written by the story writer (expert), and b) corresponding final version $$\left(D_f^{eval}\right)$$

prepared after a few iterations of incorporating suggestion for improvement by human reviewers. Both $$D_i^{eval}, D_f^{eval}$$

consisted of paired initial and final versions of the 67 EE stories, where number of sentences were 2517, and 2010 respectively. Median lengths of these stories were 33 and 29 sentences for $$D_i^{eval}, \ and \ D_f^{eval}$$

respectively.

The following 3 baseline metrics were explored.

1. Readability score: For this purpose, Flesch reading-ease score (FRES) was used, and was calculated as:

$$FRES(s) = 206.835 - 1.015 * \frac{\text{\# words in } s}{\text{\# sentence in } s} - 84.6 * \frac{\text{\# syllables in } s}{\text{\# words in } s}$$

Higher values of FRES indicate better readability. If any story has lower readability than a threshold, then a few longest sentences (in terms of # of words) and a few longest words (in terms of # of syllables) are suggested for potential simplification. For $D^{train}$

TABLE 2

| Metric | p10 | q1 | q2 | q3 | mean (μ) | st. deviation (σ) |
|---|---|---|---|---|---|---|
| Skills_density | 0.000 | 0.048 | 0.103 | 0.174 | 0.125 | 0.103 |
| Tasks_density | 0.300 | 0.387 | 0.500 | 0.615 | 0.509 | 0.178 |
| Roles_density | 0.037 | 0.067 | 0.100 | 0.148 | 0.111 | 0.066 |
| Concepts_density | 0.000 | 0.875 | 1.333 | 1.681 | 1.193 | 0.746 |
| Background_density | 0.053 | 0.091 | 0.136 | 0.188 | 0.143 | 0.078 |
| Problem_density | 0.091 | 0.143 | 0.200 | 0.269 | 0.209 | 0.097 |
| Exp_Knowledge_density | 0.043 | 0.074 | 0.107 | 0.143 | 0.113 | 0.056 |
| Solution_density | 0.192 | 0.250 | 0.320 | 0.400 | 0.327 | 0.108 |
| Benefit_density Cl. | 0.050 | 0.091 | 0.138 | 0.190 | 0.143 | 0.073 |
| Appreciation_density | 0.000 | 0.037 | 0.061 | 0.091 | 0.066 | 0.042 |

15 mean FRES score was observed to be 40.2, with standard deviation of 8.4, so threshold used was 31.8 (mean-st. dev.).

Perplexity: It was used for evaluating the quality of a language model used. This metric was used to evaluate a specific sequence of sentence categories appeared in the EE story. The language model (using bigrams and trigrams of sentence categories) was learned over the sequences of sentence categories appearing in $D^{train}$. Hence, lower perplexity indicates more similarity with the sequences of sentence categories observed in $D^{train}$ Essay Grading (EG): A hierarchical neural network was trained using an ASAP3 dataset, and this was further evaluated on $$D_i^{eval}, \text{ and } D_f^{eval}.$$

Evaluation Strategy

Each evaluation metric (i.e. the knowledge quality and narration flow quality metrics as well as the baseline metrics) were evaluated for both the datasets $$D_i^{eval}, \text{ and } D_f^{eval}.$$

Further, for each metric, it was determined whether it is consistently assigning a better score for a final version of a story as compared to its corresponding initial version. For this purpose, a one-sided, two-samples, paired t-test was used to check whether the scores for final stories are significantly better than those of initial stories, using a specific metric. Here, the intuition behind this evaluation was that each story in $$D_i^{eval}$$

is revised as per the suggestions of human reviewers to obtain the corresponding story in $$D_f^{eval}.$$

If the knowledge quality and narration flow quality metrics consistently assigns a better value for a final version of a story as compared to its initial version, then it can be said that the metric is able to capture the same aspects of the story which human reviewers also think are important. Moreover, because the automatically generated suggestions for improvement were based on the same metrics, this evaluation strategy also implicitly measured the effectiveness of those suggestions.

Details of the one-sided, two-samples, paired t-test for a metric m is given hereafter. Values of metric m for all 67 stories in $$D_i^{eval}, \text{ and } D_f^{eval}$$

16 were computed, so that two paired samples of size 67 each;

$$S_i^{eval}, \text{ and } S_f^{eval}$$

are obtained. The null and alternate hypotheses used were as follows:

$$H_0: \text{Mean of } S_i^{eval} = \text{Mean of } S_f^{eval}$$

$H_1$: Mean of $S_i^{eval} <$ Mean of $S_f^{eval}$ (if the metric $m$ is such that higher values indicate better quality)

OR $H_1$: Mean of $S_i^{eval} >$ Mean of $S_f^{eval}$ (if the metric $m$ is such that lower values indicate better quality)

Analysis of Results

Table. 3 shows evaluation results for a) the aggregated knowledge quality metrics ($D_{mean}$ and $Z_{sum}$) and the flow quality metric ($SCF_{all}$), and b) the baseline metrics (FRES, perplexity, and EG). The aggregated metrics $D_{mean}$ and $Z_{sum}$ capture combined effect of the knowledge quality metrics used, and both the metrics show statistically significant difference between $$S_i^{eval}, \text{ and } S_f^{eval}.$$

The metric $SCF_{all}$ also showed statistically significant difference between $$S_i^{eval}, \text{ and } S_f^{eval}.$$

However, for the baseline metric perplexity, statistically there was no difference between $$S_i^{eval}, \text{ and } S_f^{eval}$$

at $\alpha = 0.05$.

TABLE 3

| Metric | Mean ($S_i^{eval}$) | Mean ($S_f^{eval}$) | p-value |
|---|---|---|---|
| $Dist_{mean}$ | 3.064 | 2.544 | 0.00001 |
| $Z_{sum}$ | −0.053 | 0.089 | 0.00043 |
| $SCF_{all}$ | 10.443 | 8.015 | 0.02974 |
| FRES | 36.147 | 35.111 | 0.89956 |
| Perplexity | 6.486 | 6.178 | 0.08759 |
| EG | 0.654 | 0.613 | 0.98258 |

FRES was designed to measure ease of reading and although it was an important aspect of a narrative text, in case of EE stories, the more emphasis is given to produce knowledge-rich text. Such knowledge-dense documents may become little less readable which could be observed in the experiments where the average readability of the final EE stories was a little less than the original versions. Similarly, EG was assigning higher scores for initial versions of the EE stories as compared to the final versions. This indicated that the essay grading techniques gave more importance to other aspects than those measuring the knowledge and flow quality in non-fiction documents like EE stories. For computing Perplexity, bigrams and trigrams of sentence categories were considered. Hence, it tends to focus on small local window (of 2-3 sentences) and may not capture overall order of sentence categories in an entire EE story. On the other hand, the metric SCF was able to evaluate flow of sentence categories in a better way as it is not limited within a small local window of sentences. Rather, it focused on identifying sentences whose relative placement in an EE story was quite unusual.

Deployment: The system 100 was deployed for evaluating EE stories as well as for automatically generating suggestions for improvement. The initial feedback of the system was positive.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of evaluation of documents containing non-fiction narrative text data. The embodiment, thus provides a mechanism for computing corpus statistics for a corpus of documents containing non-fiction narrative text content. Moreover, the embodiments herein further provide a mechanism of evaluating non-fiction narrative text document using the computed corpus statistics.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for evaluating non-fiction narrative text document, comprising:

receiving, via one or more hardware processors, a plurality of non-fiction narrative text documents as input, wherein the plurality of non-fiction narrative text documents are collected as real-time input;

identifying, via the one or more hardware processors, one or more categories associated with each of a plurality of sentences in each of the plurality of non-fiction narrative text documents by building a classifier, wherein the classifier is built by representations of a text of each sentence and representations for each word in each sentence;

extracting, via the one or more hardware processors, a plurality of entities associated with a plurality of knowledge markers from the plurality of non-fiction narrative text documents, wherein the plurality of knowledge markers is specific to contents of each of the narrative text documents including skills, tasks, roles, and domain-specific concepts, wherein mentions of the skill are extracted by performing a lookup in a large gazette of known skill names, mentions of the tasks are extracted using linguistic rules, mentions of the roles are extracted by performing lookup in a gazette, and domain specific concepts are extracted upon computing domain relevance scores for all noun phrases and selecting only noun phrases that are above a threshold;

calculating, via the one or more hardware processors, one or more knowledge quality metrics for each of the plurality of non-fiction narrative text documents based on the knowledge markers and the identified one or more categories;

calculating, via the one or more hardware processors, a relative position of sentences of the one or more categories, in each of the plurality of non-fiction narrative text documents;

computing, via the one or more hardware processors, a plurality of corpus statistics for each of the one or more knowledge quality metrics and the relative position of the sentences of the one or more categories, wherein the plurality of corpus statistics is used to evaluate a non-fiction narrative text document received as an input document, wherein evaluating the non-fiction narrative text document comprises:

obtaining the non-fiction narrative text document as input;

processing the non-fiction narrative text document using the plurality of corpus statistics, comprising:

identifying one or more categories of each sentence in the input document;

extracting a plurality of entities associated with a plurality of knowledge markers from the non-fiction narrative text document;

calculating one or more knowledge quality metrics of the non-fiction narrative text document based on the plurality of knowledge markers and the identified one or more categories;

determining a quality of the non-fiction narrative text document based on comparison of the one or more knowledge quality metrics of the non-fiction narrative text document with the plurality of corpus statistics;

calculating the relative position of sentences of the one or more categories, in the input document;

computing a sentence categories flow metric of the non-fiction narrative text document based on a determined sentence categories flow in the plurality of non-fiction narrative text documents, by comparing with the corpus statistics of the relative position of sentences of the one or more categories;

generating at least one suggestion for improvement of the non-fiction narrative text document automatically, over the determined quality, based on the sentence categories flow metric and the one or more knowledge quality metrics; and recommending, via the one or more hardware processors, the generated at least one suggestion to a user and displayed via a suitable user interface.

2. The processor implemented method of claim 1, wherein the plurality of non-fiction narrative documents are documents that are reviewed and re-written incorporating one or more expert suggestions, wherein the one or more expert suggestions are further reviewed by one or more reviewers for knowledge contents, readability, narration flow and grammar in iterative manner.

3. A system for evaluating non-fiction narrative text document, comprising:

one or more hardware processors;

a communication interface; and a memory storing a plurality of instructions, wherein the plurality of instructions cause the one or more hardware processors to:

receive a plurality of non-fiction narrative text documents, wherein the plurality of non-fiction narrative text documents are collected as real-time input;

identify one or more categories associated with each of a plurality of sentences in each of the plurality of non-fiction narrative text documents by building a classifier, wherein the classifier is built by representations of a text of each sentence, and representations for each word in each sentence;

extract a plurality of entities associated with a plurality of knowledge markers from the plurality of non-fiction narrative text documents, wherein the plurality of knowledge markers is specific to contents of each of the narrative text documents including skills, tasks, roles, and domain-specific concepts, wherein mentions of the skill are extracted by performing a lookup in a large gazette of known skill names, mentions of the tasks are extracted using linguistic rules, mentions of the roles are extracted by performing lookup in a gazette, and domain specific concepts are extracted upon computing domain relevance scores for all noun phrases and selecting only noun phrases that are above a threshold;

calculate one or more knowledge quality metrics for each of the plurality of non-fiction narrative text documents based on the knowledge markers and the identified one or more categories;

calculate the relative position of sentences of the one or more categories, in each of the plurality of non-fiction narrative text documents; and compute a plurality of corpus statistics for each of the one or more knowledge quality metrics and the relative position of the sentences of the one or more categories, wherein the one or more hardware processors are configured to use the plurality of corpus statistics to evaluate a non-fiction narrative text document received as an input document, by:

obtaining the non-fiction narrative text document as input; and processing the non-fiction narrative text document using the plurality of corpus statistics, comprising:

identifying one or more categories of each sentence in the input document;

extracting a plurality of entities associated with a plurality of knowledge markers from the non-fiction narrative text document;

calculating one or more knowledge quality metrics of the non-fiction narrative text document based on the plurality of knowledge markers and the identified one or more categories;

determining a quality of the non-fiction narrative text document based on comparison of the one or more knowledge quality metrics of the non-fiction narrative text document with the plurality of corpus statistics;

calculating the relative position of sentences of the one or more categories, in the input document;

computing a sentence categories flow metric of the non-fiction narrative text document based on a determined sentence categories flow in the plurality of non-fiction narrative text documents, by comparing with the corpus statistics of the relative position of sentences of the one or more categories;

generating at least one suggestion for improvement of the non-fiction narrative text document automatically, over the determined quality, based on the sentence categories flow metric and the one or more knowledge quality metrics; and recommend the generated at least one suggestion to a user and displayed via a suitable user interface.

4. The system of claim 3, wherein the one or more hardware processors are configured to use documents that are reviewed and re-written incorporating one or more expert suggestions, as the plurality of non-fiction narrative, wherein the one or more expert suggestions are further reviewed by one or more reviewers for knowledge contents, readability, narration flow and grammar in iterative manner.

5. One or more non-transitory machine-readable information storage mediums comprising one or more instructions which when executed by one or more hardware processors cause:

receiving a plurality of non-fiction narrative text documents wherein the plurality of non-fiction narrative text documents are collected as real-time input;

identifying one or more categories associated with each of a plurality of sentences in each of the plurality of non-fiction narrative text documents by building a classifier, wherein the classifier is built by representations of a text of each sentence, and representations for each word in each sentence;

extracting a plurality of entities associated with a plurality of knowledge markers from the plurality of non-fiction narrative text documents, wherein the knowledge markers is specific to contents of each of the narrative text documents including skills, tasks, roles, and domain-specific concepts, wherein mentions of the skill are extracted by performing a lookup in a large gazette of known skill names, mentions of the tasks are extracted using linguistic rules, mentions of the roles are extracted by performing lookup in a gazette, and domain specific concepts are extracted upon computing domain relevance scores for all noun phrases and selecting only noun phrases that are above a threshold;

calculating one or more knowledge quality metrics for each of the plurality of non-fiction narrative text documents based on the knowledge markers and the identified one or more categories;

calculating the relative position of sentences of the one or more categories, in each of the plurality of non-fiction narrative text documents; and computing a plurality of corpus statistics for each of the one or more knowledge quality metrics and the relative position of the sentences of the one or more categories, wherein the plurality of corpus statistics is used to evaluate a non-fiction narrative text document received as an input document, wherein evaluating the non-fiction narrative text document comprises:

obtaining the non-fiction narrative text document as input; and processing the non-fiction narrative text document using the plurality of corpus statistics, comprising:

identifying one or more categories of each sentence in the input document;

extracting a plurality of entities associated with a plurality of knowledge markers from the non-fiction narrative text document;

calculating one or more knowledge quality metrics of the non-fiction narrative text document based on the plurality of knowledge markers and the identified one or more categories;

determining a quality of the non-fiction narrative text document based on comparison of the one or more knowledge quality metrics of the non-fiction narrative text document with the plurality of corpus statistics;

calculating the relative position of sentences of the one or more categories, in the input document;

computing a sentence categories flow metric of the non-fiction narrative text document based on a determined sentence categories flow in the plurality of non-fiction narrative text documents, by comparing with the corpus statistics of the relative position of sentences of the one or more categories;

generating at least one suggestion for improvement of the non-fiction narrative text document automatically, over the determined quality, based on the sentence categories flow metric and the one or more knowledge quality metrics; and recommending the generated at least one suggestion to a user and displayed via a suitable user interface.

6. The one or more non-transitory machine-readable information storage mediums of claim 5, wherein the plurality of non-fiction narrative documents are documents that are reviewed and re-written incorporating one or more expert suggestions, wherein the one or more expert suggestions are further reviewed by one or more reviewers for knowledge contents, readability, narration flow and other aspects like grammar in iterative manner.

* * * * *